United States Patent
Kinoe et al.

[11] Patent Number: 6,160,556
[45] Date of Patent: Dec. 12, 2000

[54] METHOD OF SELECTING AN OBJECT AND SYSTEM THEREOF

[75] Inventors: Yohsuke Kinoe, Yokohama; Toshiyuki Hama, Tokyo; Minako Matsuda, Zama, all of Japan

[73] Assignee: International Business Machines Corporation, Armonk, N.Y.

[21] Appl. No.: 09/168,891

[22] Filed: Oct. 9, 1998

[30] Foreign Application Priority Data

Nov. 28, 1997 [JP] Japan ................................. 9-328575

[51] Int. Cl.[7] ........................................... G06F 15/00
[52] U.S. Cl. ........................................................ 345/419
[58] Field of Search ............................. 345/419, 433, 345/157, 162, 355, 356, 357, 342

[56] References Cited

U.S. PATENT DOCUMENTS

| | | | |
|---|---|---|---|
| 4,698,625 | 10/1987 | McCaskill et al. | 340/709 |
| 5,293,313 | 3/1994 | Cecil et al. | 382/131 |
| 6,081,267 | 6/2000 | Stockham et al. | 345/334 |

FOREIGN PATENT DOCUMENTS

| | | |
|---|---|---|
| 7-77231 | 3/1995 | Japan . |
| 8-305874 | 11/1998 | Japan . |

*Primary Examiner*—Phu K. Nguyen
*Attorney, Agent, or Firm*—McGuireWoods LLP; Louis J. Percello

[57] ABSTRACT

A method and a system precisely selects a three-dimensional object hidden inside complex objects. A retrieval object is disposed in the proximity of a pointer to retrieve a three-dimensional object, all three-dimensional objects included within or touching the retrieval object are retrieved, a sub-window is displayed, an area in the sub-window is divided into a plurality of regions corresponding to the number of retrieved three-dimensional objects and, in response to the pointer being positioned within one of said plurality of regions within said sub-window, a corresponding three-dimensional object within a main window is displayed distinctively over other three-dimensional objects within said main window. After a desired object is selected, the selection is finalized by a click operation of the pointer, etc.

14 Claims, 7 Drawing Sheets

METHOD OF SELECTING AN OBJECT AND SYSTEM THEREOF

BACKGROUND OF THE INVENTION

1. Field of the Invention

The present invention generally relates to a method and a system of selecting an object displayed on a computer display screen and a system thereof and, more particularly, to a method of selecting an object constituting a three-dimensional model displayed on the computer display screen with a good ease of use.

2. Background Description

In selecting a particular object among a plurality of objects constituting a three-dimensional model displayed on a computer display screen, it is often very difficult to point to a precise position because (a) an aimed object is hidden by another object, (b) there are many satisfying candidates for selection, or (c) a parallax exists in the direction of depth due to the three-dimensional display. The user has to click again and again or adjust the click position strictly. Such effort is stressful to the user. Such effort also lowers the work efficiency of a user of three-dimensional graphic software.

An example of a prior art solution to this problem is a proposed method of highlighting selected graphic images in the display by a sequential button operation in the direction of the depth (Z axis) of the display to select a desired graphic image when it is highlighted in the display. However, this method involves several disadvantages; e.g., (a) the time when the desired object is highlighted is unknown, (b) of the desired object is found to be absent when all the objects have been viewed sequentially to the last one, and (c) a plurality of objects which can be selected can not be viewed at one glance.

A method of selecting a hidden object by fewer steps of operation is known in PUPA 8-77231. This publication discloses a technique which allows positional relationship of objects to be viewed at a glance by projecting a display object and a hidden object from different directions of view onto an area which is set by a user and re-displaying a two-dimensional graphic image including each object in dispersed relation. However, there are an unlimited number of choices of different view directions in this method so that an effective view direction has to be selected. In addition, this method does not work effectively for the selection of objects in a mode where three-dimensional models are overlapped or included.

As an alternative, PUPA 7-96934 discloses a method of easily selecting an intended object without changing a point of view by selecting an object overlapping a specific range of area relative to the position of a pointer to correlate it to a transparent pop-up menu. The technique disclosed in this publication is for selecting an intended object without losing in enlargement operation an overall view of very crowded line segments as seen in a two-dimensional computer aided design (CAD) display, or the like, and is based on a presumption that the position of the object is known. However, a novel technique is needed because the user does not necessarily point precisely to an object hidden inside complex objects in the case of three-dimension.

A method of presenting a list of parts to a user for selection is included in a CAD system. In this method, it is necessary to know the name of a part in advance. In addition, even if it is known that an object lies in some place around a certain position, it has to be located in a list consisting of several hundreds to several thousands items each time it is selected so that the operation is unrealistic and work efficiency is low in this method.

SUMMARY OF THE INVENTION

It is therefore an object of the present invention to provide a method and a system of efficiently selecting a three-dimensional object displayed on a computer screen with a high work efficiency.

It is another object of this invention to provide a method and a system of allowing a three-dimensional object to be selected from a computer display screen without knowing the name of the three-dimensional object.

It is further object of this invention to provide a method and a system of allowing a three-dimensional object to be selected from a computer display screen without knowing the precise position and the name of the three-dimensional object.

It is a still further object of this invention to provide a method and a system of precisely selecting a three-dimensional object hidden inside complex objects displayed on a computer display screen.

In order to solve the above described objectives, a retrieval object is disposed in the proximity of a pointer to retrieve a three-dimensional object, all of three-dimensional objects included within or touching the retrieval object are retrieved, a sub-window is displayed, an area in the sub-window is divided into a plurality of regions corresponding to the number of retrieved three-dimensional objects and, in response to the pointer being positioned within one of said plurality of regions within said sub-window, a corresponding three-dimensional object within a train window is displayed distinctively over other three-dimensional objects within the main window. After a desired object is selected, the selection is finalized by a click operation of the pointer, or equivalent command, such as pressing the ENTER key on the keyboard.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
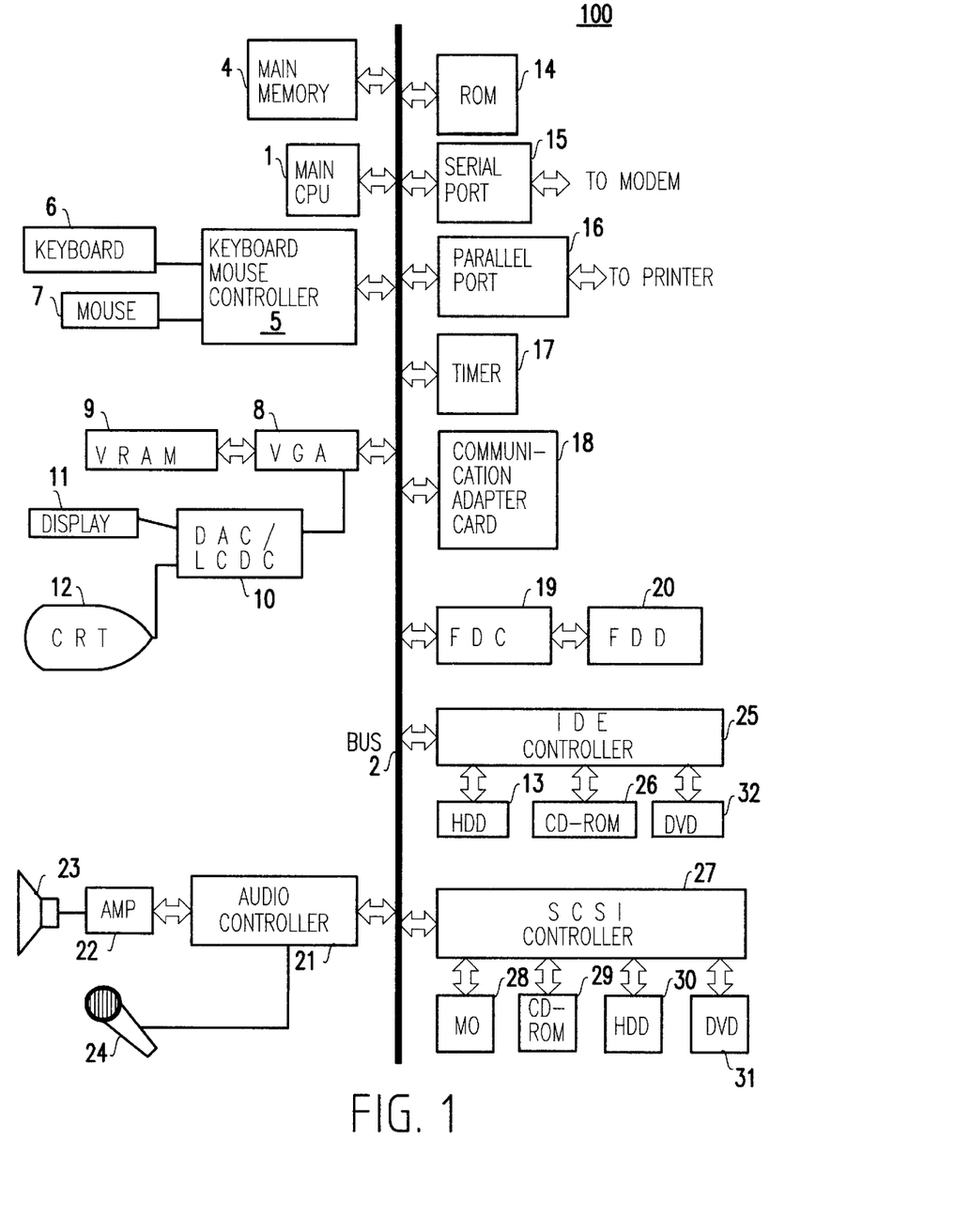
FIG. 1 is block diagram showing an example of a hardware configuration of a system used in the practice of this invention.

Referring now to the drawings, and more particularly to FIG. 1, there is shown an embodiment of the hardware configuration of a system employed in this invention. The system 100 includes a central processing unit (CPU) 1 and a memory 4. The CPU 1 and the memory 4 are connected to a hard disk device (HDD) 13, an auxiliary memory device, (or a recording medium drive device such as magneto-optical (MO), compact disk-read only memory (CD-ROM) 26, digital video disk (DVD) 32, or the like) via a bus 2 and an integrated drive electronics (IDE) controller 25. Similarly, the CPU 1 and the memory 4 are connected to a hard disk device (HDD) 30, an auxiliary memory device, (or a recording medium drive device such as MO 28, CD-ROM 23, DVD 31) via a bus 2 and a small computer system interface (SCSI) controller 27. A floppy disk device (FDD) 20 is connected to the bus 2 via a floppy disk controller (FDC) 19.

A floppy disk is inserted in the floppy disk device 20. The floppy disk, a hard disk device 13 (or a recording medium such as MO, CD-ROM 26, DVD 32) and a read only memory (ROM) 14 may record therein a computer program code or data for providing instructions to the CPU 1 in cooperation with an operating system (OS) to practice this invention, which instructions are executed by being loaded in the memory 4. The computer program may be compressed or divided into a plurality of pieces for recording in a plurality of media.

The system 100 may be further provided with a user interface hardware and have a pointing device (mouse and joystick, etc.) 7, a keyboard 6 and a display 12 for presenting visual data to the user. It is also possible to connect a printer via a parallel port 16 and a modem via a serial port 15. The system 100 can be connected to a network via a serial port 15 and a modem or via a communication adapter 18 (Ethernet and token ring) for communication with other computers. It is also possible to connect a remote transmission and receiving equipment to the serial port 15 or the parallel port 16 for transmitting and receiving data by means of an infrared radiation or a radio wave.

A speaker 23 receives an audio signal which is D/A converted (digital/analog conversion) by an audio controller 21 via an amplifier 22 to output as a voice. The audio controller 21 can also A/D converted (analog/digital conversion) voice information received from a microphone 24 to take in voice information external to the system into the system.

It will be readily understood that the system of this invention can be practiced with a conventional personal computer (PC), a workstation, a notebook PC, a palm top PC, a network computer, various home electric appliances such as a television in which a computer is implemented, a game machine, a telephone device, a facsimile device, a portable telephone device, a PHS and an electronic notebook, or a combination thereof. It should be understood that these components are exemplarily given and all these components are not necessarily indispensable to this invention.

Figure 2:
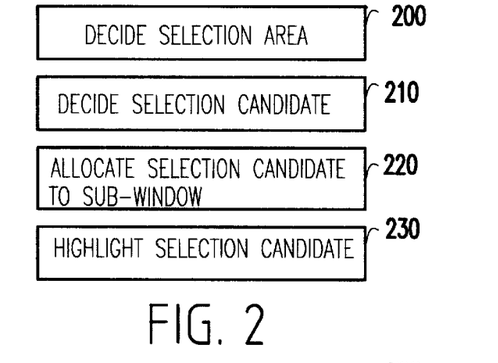
FIG. 2 is a flow diagram showing a general flow of the object selecting method according to this invention.

The A method of selecting an object hidden by another object on the display by a pointer operation (operation of a mouse, etc.) from a three-dimensional display screen is now described with reference to FIG. 2.

In step 200, a selection space oriented toward the direction of depth within the main window is decided. Specifically, a retrieved object for searching a three-dimensional object in the main window is disposed in the proximity of the pointer.

In step 210, a selection candidate overlapping the selection space is determined. All three-dimensional objects included within or touching the retrieval object are retrieved here.

In step 220 (the selection candidates are allocated to the sub-window. The sub-window is displayed in the screen and the area within the sub-window is divided into a plurality of regions corresponding to the number of the three-dimensional objects.

In step 230, the selection candidate pointed by the pointer is highlighted. Highlighting is merely one form of display attribute. For example, the color may be changed. Also, the chroma or the brightness of objects other than the candidate may be changed while the selection candidate is displayed normally (with a normal display attribute) so that it is distinctively displayed in comparison to the other objects. Simply stated, in response to the pointer being positioned in one of the plurality of regions in the sub-window, the corresponding three-dimensional object in the main window is distinctively displayed over other three-dimensional objects.

The above is the selection operation and the selected object is thereafter finally confirmed by a click operation of a mouse pointer, pressing the ENTER key, or the like.

Figure 3:
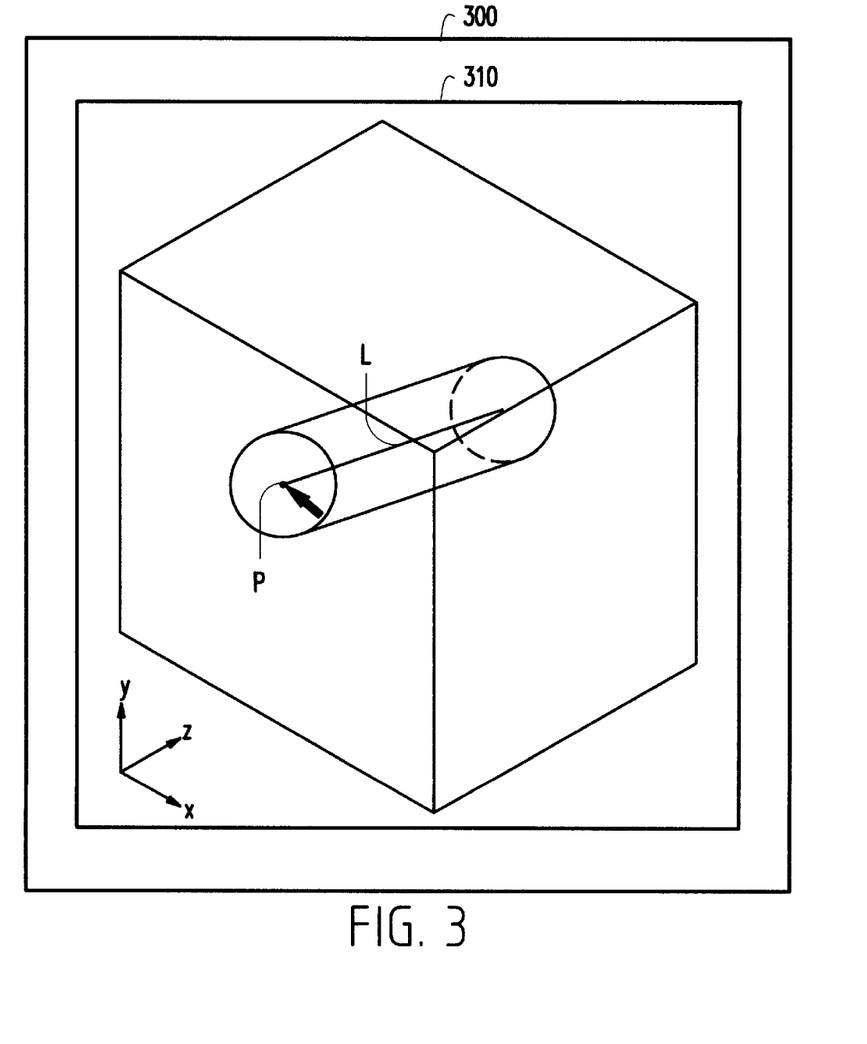
FIG. 3 is a pictorial diagram showing a main window on a display screen with a three-dimensional object displayed in the main window and a selection space within the three-dimensional object.

The method of selecting an object hidden by another object on the display by a pointer operation from a three-dimensional display screen is now described with reference to FIGS. 3 to 5. In FIG. 3, P is assumed to be the position of the pointer on the screen 300 at the time when the button of a mouse pointer, etc., is depressed in the main window 310 within the screen 300 of the cathode ray tube (CRT) 12 (FIG. 1). A ray L in the depth direction (Z direction) on the three-dimensional display starting at the point P is determined. The selection space is assumed to be the neighboring space in the three-dimensional space having the ray L as a central axis. Examples of the selection space include a cylindrical space having the ray L as a central axis. This selection space is referred to as a retrieval object. While the retrieval object is a cylinder in the above, it may be changed to a cone or a sphere, etc., without departing from the sprit of this invention. Also, the Z direction may be defined as a direction perpendicular to the screen, and the retrieval object can be made to correspond to the depth direction as seen by the user.

Figure 4:
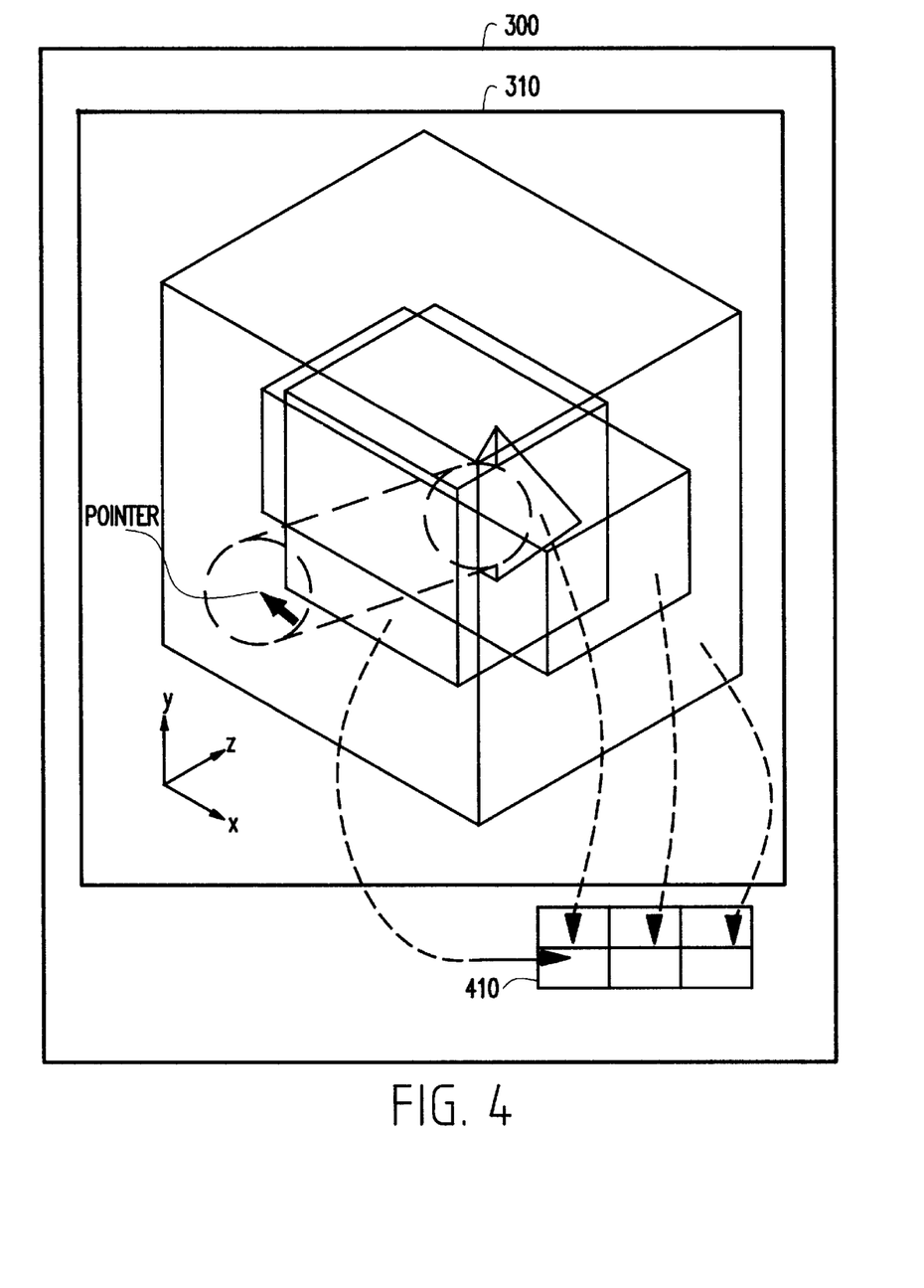
FIG. 4 is a pictorial diagram similar to that of FIG. 3 and additionally showing the opening of a sub-window to facilitate the selection of an object.

In FIG. 4, all objects having a portion common to the retrieval object (cylinder) defined by the point P are chosen as selection candidates in the three-dimensional space of the main window 310. A sub-window 410 is displayed in a suitable position in the screen and divided into the same number of regions as the selection candidates for allocating the candidates to the regions. It is preferable that the sub-window 410 is transparent with only the internal divided frames being displayed in view of the practicality of the operation.

Figure 5:
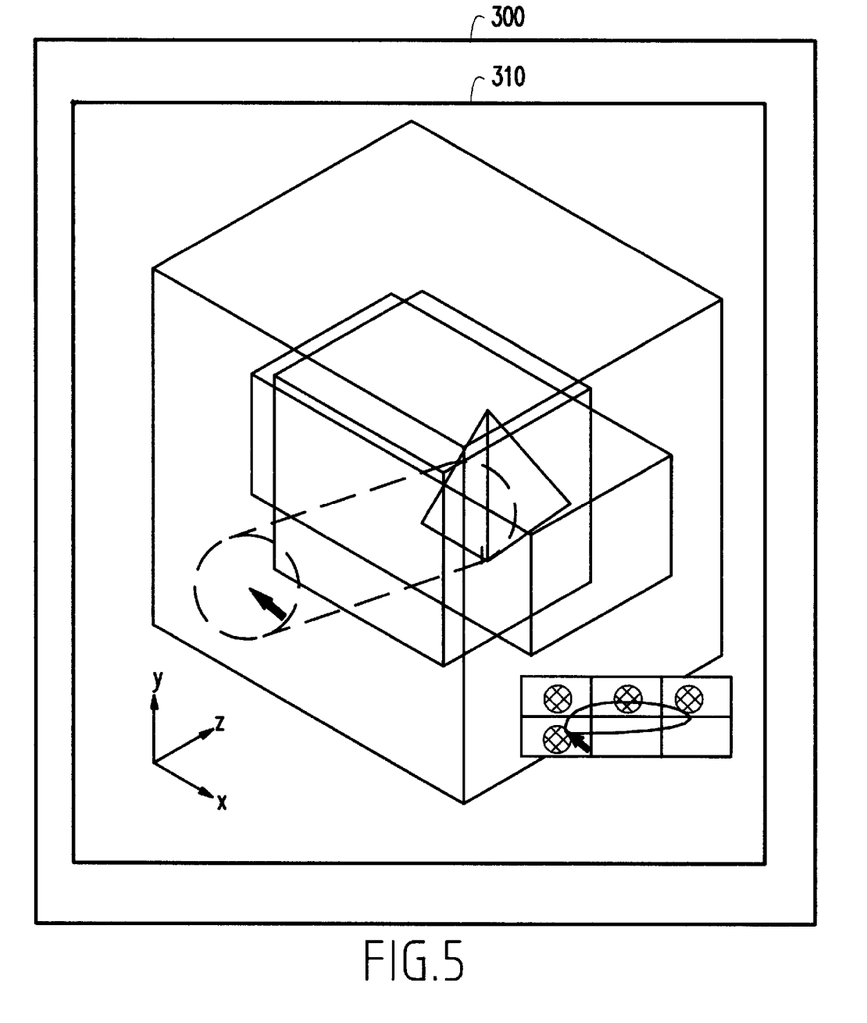
FIG. 5 is a pictorial diagram similar to that of FIG. 4 and additionally showing the movement of a pointer within the sub-window.

In FIG. 5, a pointer is then displayed inside the sub-window 410 and constrained from moving out of the boundary of the sub-window until a series of operations to select an object has been completed. The attribute of the object selected as a selection candidate is changed so that it is displayed in a wire frame or translucent form to make their appearances recognizable. At this moment, display of these selection candidates may be overlapped on each other in a complex form. The sub-window may be in the form of a pop-up menu or other form. Further, each divided region of the sub-window may have a corresponding three-dimensional object displayed in a reduced size with a system which is capable of high speed processing. Then, the selected object can be recognized in both the main window and the sub-window resulting in an improved visual interface.

The display attribute of the object selected for a selection candidate is changed into a highlighted (high brightness) condition when the pointer enters the corresponding divided region in the sub-window. For a wire frame, the color of the wire may be changed. Objects other than the object selected for the selection candidate may be translucent while the selected object remains in a normal display. Further, one of the objects may be a surface display while the other objects may be displayed in wire frame or in translucence. Because the movement of the pointer is limited to the interior of the sub-window while the button is depressed, the user suitably moves a mouse while watching the screen he or she is working on to so move the pointer that the intended object is highlighted.

Occasionally, the hidden object may not be included in the selection candidates. In such a case, it would be necessary to allow the selection candidates to be changed by updating the selection space (retrieval object) while depressing the button (mouse button, etc.) of the pointer so that an intended object is readied without losing the operability. To this end, the selection space (retrieval object) is updated when it is detected that the pointer moves faster than a predetermined speed. Updating of the selection space (retrieval object) includes enlargement/reduction of the space or movement of the space, for example. Detection of the direction of movement of the pointer allows four different updating operations to be allocated in respective directions. When the aimed object does not show up or the number of candidate objects are too many, the search range or the position of the search range is changed (movement of the search range).

As a method of changing the search range, the following methods, illustrated in FIGS. 6 and 6A to 6D, and FIGS. 7 and 7A to 7D, may be practiced.

Figure 6:
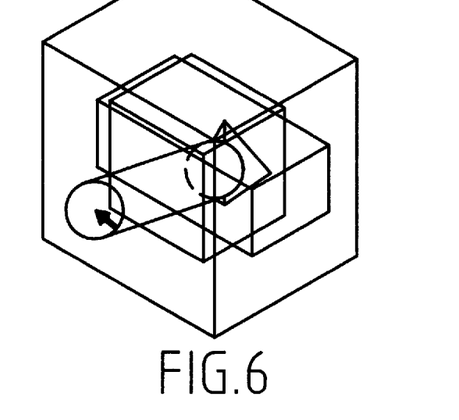
FIG. 6 is a pictorial diagram showing a three-dimensional object with a selection space to illustrate a method of changing a search range.
Figure 6A:
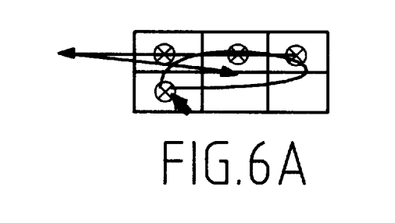
FIG. 6A is a pictorial diagram of a sub-window showing movement the pointer of a out of the sub-window to the left.
Figure 6B:
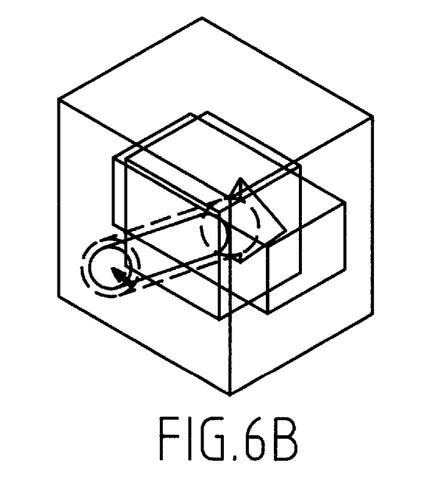
FIG. 6B is a pictorial diagram similar to that of FIG. 6 and showing the decrease in search range as a result of the movement of the pointer in FIG. 6A.
Figure 6C:
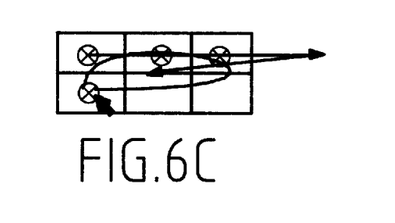
FIG. 6C is a pictorial diagram of a sub-window showing movement of the pointer out of the sub-window to the right.
Figure 6D:
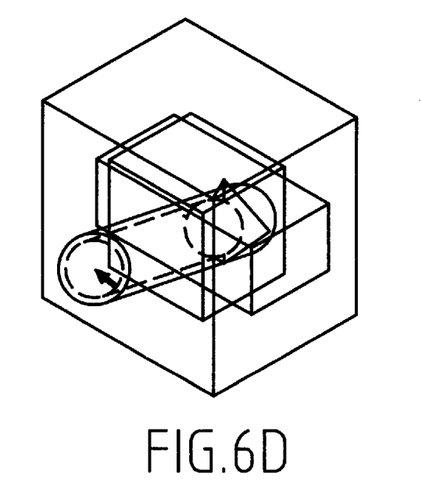
FIG. 6D is a pictorial diagram similar to that of FIG. 6 and showing the decrease in search range as a result of the movement of the pointer in FIG. 6C.

When the pointer is moving out of the frame of the sub-window at a speed greater than a predetermined speed, the search range is modified depending on the direction of the movement. For, example, if the pointer moves out toward the left at a speed greater than the predetermined speed (FIG. 6A), the search range is reduced (FIG. 6B) while the search range is expanded (FIG. 6D) if the pointer moves out toward the right at a speed greater than the predetermined speed (FIG. 6C).

Figure 7:
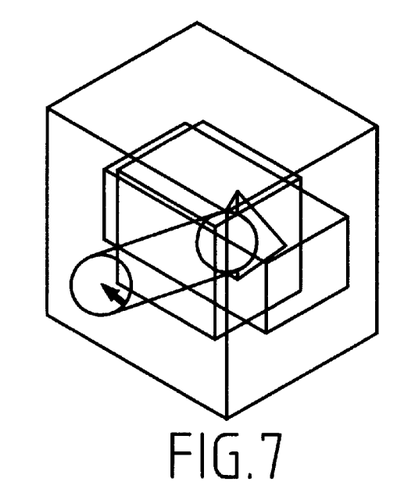
FIG. 7 is a pictorial diagram showing a three-dimensional object with a selection space to illustrate a second method of changing a search range.
Figure 7A:
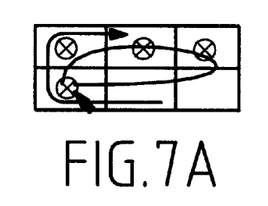
FIG. 7A is a pictorial diagram of a sub-window showing clockwise movement of the pointer within the sub-window.
Figure 7B:
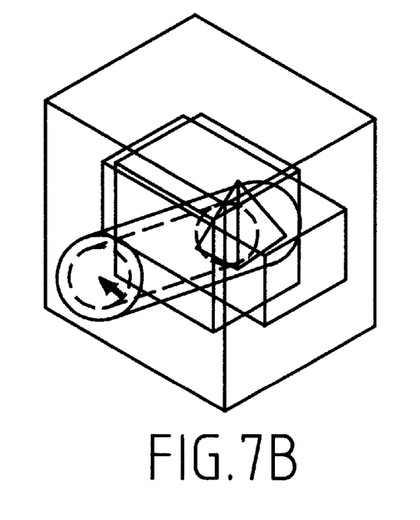
FIG. 7B is a pictorial diagram similar to that of FIG. 7 and showing the decrease in search range as a result of the clockwise movement of the pointer in FIG. 7A.
Figure 7C:
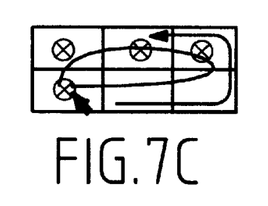
FIG. 7C is a pictorial diagram of a sub-window showing counter-clockwise movement of the pointer within the sub-window.
Figure 7D:
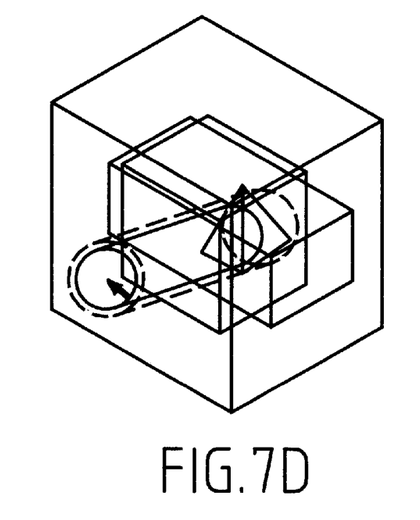
FIG. 7D is a pictorial diagram similar to that of FIG. 7 and showing the decrease in search range as a result of the counter-clockwise movement of the pointer in FIG. 7C.
Figure 8:
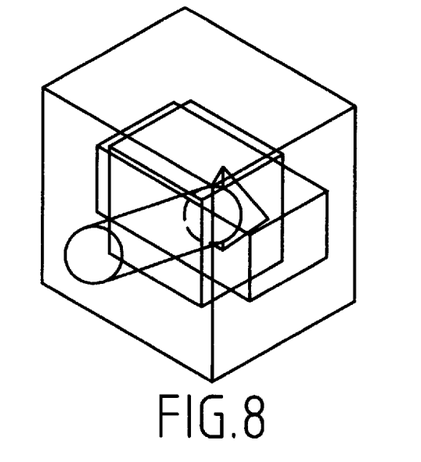
FIG. 8 is a pictorial diagram showing a three-dimensional object with a selection space to illustrate a method of changing the position of a search range.
Figure 8A:
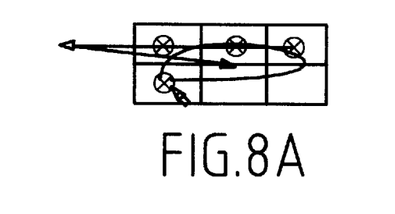
FIG. 8A is a pictorial diagram of a sub-window showing movement the pointer of a out of the sub-window to the left.
Figure 8B:
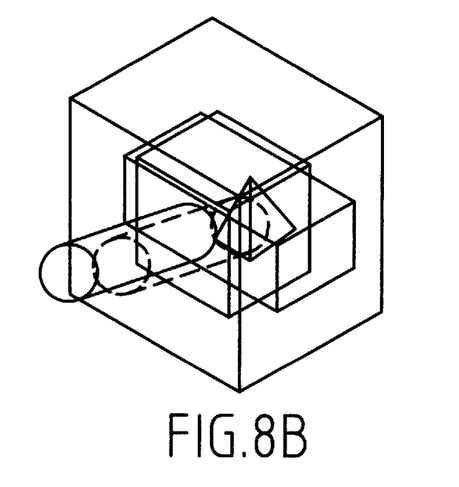
FIG. 8B is a pictorial diagram similar to that of FIG. 8 and showing the change in search position to the left as a result of the movement of the pointer in FIG. 8A.
Figure 8C:
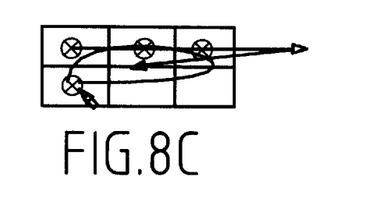
FIG. 8C is a pictorial diagram of a sub-window showing movement of the pointer out of the sub-window to the right.
Figure 8D:
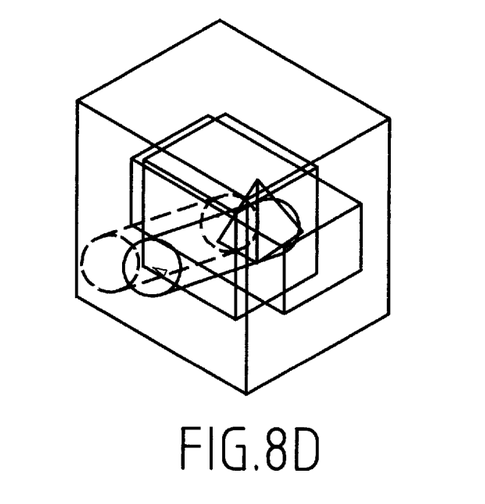
FIG. 8D is a pictorial diagram similar to that of FIG. 8 and showing the change in search position to the right as a result of the movement of the pointer in FIG. 8C.

After the pointer has made one circle within the frame of the sub-window, the range is progressively modified each time the number of circles increases or the range is expanded (FIG. 7B) or reduced (FIG. 7D) depending on the number of circles made clockwise (FIG. 7A) or counterclockwise (FIG. 7B).

By providing a region for modifying the search range outside the frame of the sub-window, the range is modified when the pointer stays in the region longer than a predetermined length of time.

For modifying the position of the search range (movement of the search range), the following method, illustrated in FIGS. 8 and 8A to 8D, may be practiced.

When the pointer is moving out of the frame of the sub-window faster than a predetermined speed, the search range is moved depending on the direction of the movement. For example, if the pointer moves out toward the left (FIG. 8A) faster than the predetermined speed, the search range is moved to the left (FIG. 8B) while the search range is moved to the right (FIG. 8D) if the pointer moves out toward the right (FIG. 8C) faster than the predetermined speed.

Also, from the view point of operability, a method may be employed in which only a newly found selection candidate is allocated to the sub-window in the case of expansion and movement of the search range.

The following methods may be employed in displaying selection candidates when the number of candidates of the object are too many.

When the pointer is moving out of the frame of the sub-window faster than a predetermined speed, the selection group is changed depending on the direction of the movement. The retrieved three-dimensional objects are separated into groups in advance. If the pointer moves out, for example, upward faster than the predetermined speed, a group preceding to the current group is displayed while a group following the current group is displayed if the pointer moves out downward faster than the predetermined speed.

Figure 9:
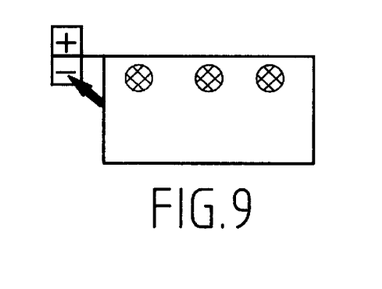
FIG. 9 is a pictorial diagram of a sub-window showing a method of selecting a group of objects.

The retrieved three-dimensional objects are separated into groups and a window for selecting an object group is displayed for selecting the group (FIG. 9).

In order to finalize selection from the selection candidates, the object to be selected is decided by releasing the mouse button when the intended object is highlighted by the pointer operation in the sub-window. Conversely, the selection operation may be performed while releasing the button of the pointer, and selection may be finalized by depressing the mouse button instead of selecting while depressing the mouse button. Alternatively, a selection can be finalized by pressing the ENTER key.

According to this invention, the user can concentrate on the display screen of the main window without seeing a list because the display of the selection objects in front of the user's eyes changes simply by circulating the pointer on the sub-window. Further, the user can select a three-dimensional object simply by clicking an approximate position similarly to a conventional operation even if the user has no knowledge of the precise position of the aimed at three-dimensional object and the registered precise name of a part.

While the invention has been described in terms of preferred embodiments and alternatives, those skilled in the art will recognize that the invention can be practiced with modification within the spirit and scope of the appended claims.

Having thus described our invention, what we claim as new and desire to secure by Letters Patent is as follows:

1. A system for selecting a particular three-dimensional object by means if a pointer from a plurality of three-dimensional objects displayed in a main window in a screen comprising:
   (a) means for disposing a retrieval object for retrieving a three-dimensional object in the proximity of the pointer within said main window,
   (b) means for retrieving all of three-dimensional objects included within or touching the retrieval object,
   (c) means for displaying a sub-window in said screen and dividing the area of said sub-window into a plurality of regions corresponding to a number of retrieved three-dimensional objects and,
   (d) means responsive to the pointer being positioned within one of said plurality of regions within said sub-window for displaying a corresponding three-dimensional object within a main window distinctively over other three-dimensional objects within said main window.

2. The system of claim 1 further comprising:
   (e) means for measuring the speed of the pointer when it moves out of said sub-window and changing a scale of said retrieved object depending on a direction in which the pointer moves out when said speed exceeds a predetermined speed.

3. The system of claim 2 in which said means for changing the scale of the retrieval object (e) comprises:
   means for reducing the scale of said retrieval object to narrow a range of search when said pointer moves out upwardly, and
   means for expanding the scale of said retrieval object to widen the range of search when said pointer moves out downwardly.

4. The system of claim 1 further comprising:
   (f) means for measuring the speed of the pointer when it moves out of said sub-window and changing the position of the search range by moving said retrieval object in a direction in which the pointer moves out when said speed exceeds a predetermined speed.

5. The system of claim 1 further comprising means for separating retrieved three-dimensional objects into groups when said means for dividing said sub-window into a plurality of regions (c) is unable to divide the area up to a number of all the retrieved objects, changing the pointer to a desired object group by having the pointer move out of said sub-window at a speed greater than a predetermined speed, and dividing the sub-window into a plurality of regions corresponding to the number of three-dimensional objects in the changed group.

6. The system of claim 1 further comprising means for separating retrieved three-dimensional objects into groups when said means for dividing said sub-window into a plurality of regions (c) is unable to divide the area up to a number of all the retrieved objects, displaying a window for selecting an object group, selecting a group in said window for selecting the object group, and dividing the sub-window into a plurality of regions corresponding to the number of three-dimensional objects in the selected group.

7. The system of claim 1 in which said retrieval object is displayed with an invisible attribute.

8. The system of claim 1 in which said means for dividing said sub-window into a plurality of regions (c) includes means for displaying in each of said plurality of regions a corresponding three-dimensional object with the size being reduced.

9. The system of claim 1 in which said means for displaying distinctively (d) displays a corresponding three-dimensional object with a display attribute which is different from either three-dimensional objects.

10. The system of claim 1 in which said means for displaying distinctively (d) displays a corresponding three-dimensional object normally while displaying other three-dimensional objects with a different attribute.

11. A method of selecting a particular three-dimensional object by means of a pointer from a plurality of three-dimensional objects displayed in a main window in a screen comprising the steps of:
   (a) disposing a retrieval object for retrieving a three-dimensional object in a proximity of the pointer within said main window,
   (b) retrieving all three-dimensional objects included within or touching the retrieval object,
   (c) displaying a sub-window in said screen and dividing the area of said sub-window into a plurality of regions corresponding to a number of retrieved three-dimensional objects, and
   (d) responsive to the pointer being positioned within one of said plurality of regions within said sub-window, displaying a corresponding three-dimensional object within a main window distinctively over other three-dimensional objects within said main window.

12. The method of claim 11 further comprising the step of:
   (e) measuring a speed of the pointer when it moves out of said sub-window and changing a scale of said retrieval object depending on a direction in which the pointer moves out when said speed exceeds a predetermined speed.

13. The method of claim 11 further comprising the step of:
   (f) measuring the speed of the pointer when it moves out of said sub-window and changing the position of the search range by moving said retrieval object in the direction in which the pointer moves out when said speed exceeds a predetermined speed.

14. A medium containing a program for selecting a particular three-dimensional object by means of a pointer from a plurality of three-dimensional objects displayed in a main window in a screen, said program comprising:
   (a) a function for disposing a retrieval object for retrieving a three-dimensional object in the proximity of the pointer within said main window,
   (b) a function for retrieving all three-dimensional objects included within or touching the retrieval object, (c) a function for displaying a sub-window in said screen and dividing the area of said sub-window into a plurality of regions corresponding to a number of retrieved three-dimensional objects and, (d) a function, responsive to the pointer being positioned within one of said plurality of regions within said sub-window, for displaying a corresponding three-dimensional object within a main window distinctively over other three-dimensional objects within said main window.

* * * * *